2,764,619

PREPARATION OF 1,1,1-TRIHALO-2-CHLORO-2-METHYLALKANES

Ernest A. Ikenberry and Joe G. Peterson, Manhattan, Kans., assignors to The Dow Chemical Company, Midland, Mich., a corporation of Delaware No Drawing. Application July 16, 1953,
Serial No. 368,519

6 Claims. (Cl. 260—652)

This invention is concerned with a method for the preparation of 1,1,1-trihalo-2-chloro-2-methylalkanes by the reaction of a 1,1,1-trihalo-2-methyl-2-alkanol with thionyl chloride in the presence of an anhydrous metal chloride catalyst.

According to the present invention it has been discovered that 1,1,1-trihalo-2-chloro-2-methylalkanes can be prepared in high yields by reacting a 1,1,1-trihalo-2-methyl-2-alkanol, having the formula

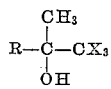

wherein R represents an alkyl, cycloalkyl or aralkyl radical and X represents bromine or chlorine, with thionyl chloride in the presence of a catalytic amount of an anhydrous chloride selected from the group consisting of aluminum chloride, ferric chloride and zinc chloride. It is among the advantages of the present invention that the desired product is produced in a relatively pure state with a minimum of undesirable by-products.

Suitable substituents as represented by R in the above formula include methyl, ethyl, propyl, butyl, hexyl, cyclohexyl, benzyl and the like. Of the above, the methyl and ethyl radicals are preferred and the process employing as a reactant 1,1,1-trichloro-2-methyl-2-propanol or the corresponding 2-butanol constitutes a preferred embodiment of the invention.

Although the precise mechanism governing the herein described reaction is not completely understood, the process may be represented as taking place according to the following equation:

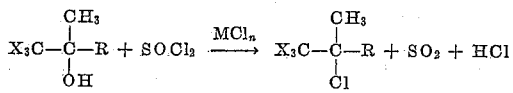

In the above, $MCl_n$ represents the catalyst, wherein M is aluminum, ferric iron or zinc and $n$ equals the valency of the metal, and R and X have the significance previously set forth.

In carrying out the invention, the thionyl chloride and catalyst as set forth above are mixed together and added to the alkanol with stirring. The resulting mixture is maintained for a period of time at a reaction temperature to complete the reaction. The reaction is initiated readily and proceeds with the evolution of hydrogen chloride and sulfur dioxide. Upon completion of the reaction, the products may be separated by pouring the crude reaction mixture into ice or water, the desired 1,1,1,2-tetrahalo-2-methylalkane precipitating as a crystalline solid. The product may be further purified, if desired, by conventional procedures such as filtration, washing, recrystallization from organic solvents and sublimation.

The reaction may be carried out in a reaction solvent if desired. Suitable solvents, such as benzene and chloroform, are capable of dissolving both the thionyl chloride and the substituted alkanol reactants and are inert to said reactants under the conditions employed. In such an operation the solvent may be recovered by distillation at the end of the reaction. In a frequently employed embodiment of the invention, an excess of thionyl chloride is used and serves as a reaction solvent.

The proportions of reactants are not critical. However, in the interest of economy and to provide optimum yields, it is desirable to employ at least one molecular proportion of thionyl chloride for each mole of alkanol in the reaction. In practice, it is preferred to employ a considerable molecular excess of the thionyl chloride reactant and good results have been obtained when using 2 to 3 or more moles of thionyl chloride per mole of alkanol. If desired, excess unreacted thionyl chloride may be recovered after completion of the reaction by distillation at atmospheric or reduced pressure.

Any suitable proportion of catalyst may be employed provided only that sufficient catalyst is utilized to effectuate the desired improvement in increasing the yields and/or the rate of the reaction. Desirable results have been obtained when employing from 0.01 to 0.1 mole of the anhydrous metal chloride catalyst per mole of the alkanol and higher proportions of catalyst may be employed if desired. When aluminum chloride is used as catalyst in the aforementioned proportions under constant temperature conditions, the time required for completion of the reaction has been found to be inversely proportional to the quantity of catalyst employed.

For a given proportion and species of catalyst the rate of the reaction is largely dependent on the temperature. In laboratory operations employing aluminum or ferric chloride as catalyst at temperatures of about 75° to 80° C., substantial yields of the desired product are obtained in less than one hour and the reaction goes essentially to completion within less than 8 hours. On the other hand, when operating at or near room temperature, reaction periods of 12 to 24 hours or more have been found desirable. In general, the reaction is carried out at from about 20° to about 80° C. and temperatures of from 30° to 50° C. are preferred. The reaction has been found operable at temperatures higher than 80° C., however, temperatures much in excess of 80° are to be avoided because of the increased formation of undesirable by-products.

The metal chloride catalysts are employed in the reaction in substantially anhydrous form. Although the chlorides of aluminum, ferric iron and zinc are operable catalysts as set forth above, it has been found that optimum yields of high-quality product and maximum rates of reaction are obtained when aluminum and ferric chlorides are employed. The use of these latter two catalysts constitutes preferred embodiments of the invention.

The 1,1,1-trihalo-2-methyl-2-alkanol may be employed either in the anhydrous or hydrated form, provided that when using the hydrated form a sufficient excess of thionyl chloride is added in the reaction to react with the water present as water of hydration. The reaction proceeds somewhat more rapidly when substantially anhydrous reagents are employed. One preferred starting material is 1,1,1-trichloro-2-methyl-2-propanol. This material is commercially available in the anhydrous form and as the hemihydrate. Since anhydrous 1,1,1-trichloro-2-methyl-2-propanol rapidly absorbs water from the atmosphere during preliminary handling operations such as grinding and weighing, it is convenient to employ a partially hydrated form or the hemihydrate in the practice of the present invention. The commercially available technical forms of thionyl chloride and the metal chloride catalysts have been found suitable for use in the reaction.

The reaction proceeds satisfactorily at atmospheric pressure although pressures somewhat above or below atmospheric may be employed, if desired.

The design of the reaction vessel for carrying out the present process is not critical provided that the material contacted by the reaction mixture and the gaseous by-products of the reaction are resistant to corrosion by acid and that suitable provision is made for the recovery of the sulfur dioxide and hydrogen chloride produced as by-products in the reaction.

A potentially valuable mode of operation consists of carrying out the process of the invention on a continuous basis. Thus, the reactants and catalyst may be mixed or otherwise blended and metered through a suitable reaction zone at controlled temperature and at such a rate as to accomplish the formation of the desired compound in high yield during the reaction interval. In such operation excess unreacted thionyl chloride and/or reaction solvent may be recovered from the crude reaction product by distillation and may be recycled.

The following examples illustrate the invention but are not to be construed as limiting:

*Example 1*

In a representative operation, 93.3 grams (0.5 mole) of the hemihydrate of 1,1,1-trichloro-2-methyl-2-propanol was placed in a reaction vessel and a mixture of 108.3 milliliters (1.5 moles) of technical thionyl chloride and 6.67 grams (0.05 mole) of anhydrous aluminum chloride added thereto with stirring at room temperature. The reaction mixture was maintained at a temperature of 30° to 33° C. with intermittent agitation for a period of 24 hours. At this time it was observed that a considerable quantity of white solid had separated. The crude reaction product was then poured into a quantity of crushed ice to decompose the catalyst and unreacted excess thionyl chloride, the crude 1,1,1,2-tetrachloro-2-methylpropane product separating as a white crystalline material. The latter was purified by filtration, washing with water and aqueous 20 percent sodium hydroxide solution and drying to obtain a 1,1,1,2-tetrachloro-2-methylpropane product as a white crystalline solid melting at 177° to 179° C. The yield of purified product was 99.3 grams or essentially 100 percent of theoretical.

*Example 2*

8.11 grams (0.05 mole) of anhydrous ferric chloride was substituted for the anhydrous aluminum choride of Example 1 and the reaction of 1,1,1-trichloro-2-methyl-2-propanol and thionyl chloride carried out as before. The reaction was initiated very rapidly at room temperature and was essentially complete in 2 hours. The crude reaction product was worked up as in the preceding example to obtain a 1,1,1,2-tetrachloro-2-methylpropane product, melting at 176° to 178° C., in a yield of 101.5 grams of crystalline solid.

*Example 3*

Following the procedure of Example 1 various proportions of 1,1,1-trichloro-2-methyl-2-propanol and thionyl chloride were reacted together in the presence of aluminum chloride. The proportions of materials, reaction conditions and yields of crystalline solid product are set forth in the following table. The yields are expressed as percent of theoretical based on the amount of the substituted propanol employed.

| Temperature, °C. | Mole ratio of reactants: substituted propanol/SOCl₂/AlCl₃ | Reaction time, hours | Yield, Percent |
| --- | --- | --- | --- |
| 25–30 | 1/2.8/0.05 | 96 | 99.5 |
| 44 | 1/2.0.05 | 16 | 85.7 |
| 44 | 1/2/0.025 | 20 | 88.4 |
| 44 | 1/2/0.01 | 32 | 76.5 |
| 50 | 1/3/0.05 | 12.5 | 91 |

*Example 4*

Following the procedure of Example 1, 93.3 grams (0.5 mole) of the hemihydrate of 1,1,1-trichloro-2-methyl-2-propanol was mixed with 178.7 grams (1.5 moles) of thionyl chloride containing 6.82 grams (0.1 mole) of anhydrous zinc chloride. The reaction was carried out and the product worked up as in Example 1 to obtain 67.4 grams (68.7 percent of theory) of 1,1,1,2-tetrachloro-2-methylpropane product. In this reaction, the crude reaction product before purification contained about 18 percent by weight of unreacted propanol starting material.

*Example 5*

95.7 grams (0.5 mole) of 1,1,1-trichloro-2-methyl-2-butanol is placed in a reaction vessel and a mixture of 108.3 milliliters (1.5 moles) of thionyl chloride and 3.33 grams (0.025 mole) of anhydrous aluminum chloride added thereto with stirring at room temperature. The reaction is carried out and the product worked up as in Example 1 to obtain 1,1,1,2-tetrachloro-2-methylbutane as a white, crystalline solid.

*Example 6*

59.5 grams (0.5 mole) of commercial technical thionyl chloride and 1.67 grams (0.05 mole) of anhydrous aluminum chloride are mixed together in a glass reaction vessel and 77.7 grams (0.25 mole) of 1,1,1-tribromo-2-methyl-2-propanol added thereto. The reaction is initiated promptly, being evidenced by the evolution of HCl and SO₂ in gaseous form. The reaction mixture is maintained at room temperature for a period of about 72 hours to complete the reaction. To the resulting crude product, water is added with stirring to break up any caked material, the water serving to decompose the catalyst and unreacted, excess thionyl chloride. The solid material is then separated by filtration and recrystallized from a light petroleum distillate (Skellysolve) to obtain the desired 1,1,1-tribromo-2-chloro-2-methylpropane as a crystalline solid. The latter was obtained in a yield of 84 percent of theory and melted in a sealed tube at 225°–227° C.

*Example 7*

73 grams (0.41 mole) of anhydrous 1,1,1-trichloro-2-methyl-2-propanol was placed in a glass reaction vessel and a mixture of 97.7 grams (0.82 mole) of technical thionyl chloride and 2.75 grams (0.02 mole) of anhydrous aluminum chloride added thereto with stirring at a temperature of 75°–80° C. Vigorous reaction ensued with evolution of gaseous HCl and SO₂. The reaction mixture was maintained at the above temperature and under reflux for a period of 15 minutes. The resulting mixture was then poured over crushed ice, the crude product precipitating as a white solid. The latter was separated by filtration and recrystallized from an acetone-alcohol-water mixture to obtain a 1,1,1,2-tetrachloro-2-methyl-propane product melting at 176°–180° C. The yield of this latter recrystallized product amounted to 66 percent of theory based on the quantity of trichloromethylpropanol employed.

In a similar fashion thionyl chloride is reacted in the presence of one of the metal chloride catalysts with 1,1,1-trichloro-2-methyl-2-octanol to produce 1,1,1,2-tetrachloro-2-methyloctane, with 1,1,1-trichloro-2-methyl-3-phenyl-2-propanol to produce 1,1,1,2-tetrachloro-2-methyl-3-phenylpropane and with 1,1,1-trichloro-2-cyclohexyl-2-propanol to produce 1,1,1,2-tetrachloro-2-cyclohexylpropane.

The 1,1,1-trihalo-2-alkanols employed in the practice of the invention are prepared by known methods, as for example, by reaction of a ketone of the formula

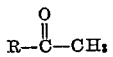

wherein R has the previously designated significance, with chloroform or bromoform in the presence of an alkaline condensing agent. In a representative preparation substantially anhydrous acetone and chloroform were condensed in the presence of powdered solid potassium hydroxide to give a 68 perecent yield of 1,1,1-trichloro-2-methyl-2-propanol. The latter can be separated and purified by fractional distillation.

We claim:

1. A process for the preparation of 1,1,1-trihalo-2-chloro-2-methylalkanes which comprises reacting a substituted alkanol of the formula

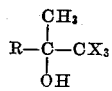

wherein R represents a member of the group consisting of alkyl, cycloalkyl and aralkyl radicals and X represents a member of the group consisting of bromine and chlorine, with thionyl chloride in the presence of a catalytic amount of an anhydrous metal chloride selected from the group consisting of aluminum chloride, ferric chloride and zinc chloride, and at a temperature of from about 20° to about 80° C.

2. A process according to claim 1 in which the metal chloride catalyst is employed in the amount of from 0.01 to 0.1 mole of said chloride per mole of substituted alkanol in the reaction.

3. A process according to claim 1 wherein the thionyl chloride is employed in the amount of at least one mole per mole of substituted alkanol in the reaction.

4. A process for preparing 1,1,1,2 - tetrachloro - 2 - methylpropane which comprises reacting 1,1,1-trichloro-2-methyl-2-propanol with thionyl chloride in the presence of a catalytic amount of an anhydrous metal chloride selected from the group consisting of aluminum chloride, ferric chloride and zinc chloride, and at a temperature of from about 20° to about 80° C.

5. A process for preparing 1,1,1-tribromo-2-chloro-2-methylpropane which comprises reacting 1,1,1-tribromo-2-methyl-2-propanol with thionyl chloride in the presence of a catalytic amount of an anhydrous metal chloride selected from the group consisting of aluminum chloride, ferric chloride and zinc chloride, and at a temperature of from about 20° to about 80° C.

6. A process for preparing 1,1,1,2 - tetrachloro - 2 - methylbutane which comprises reacting 1,1,1-trichloro-2-methyl-2-butanol with thionyl chloride in the presence of a catalytic amount of an anhydrous metal chloride selected from the group consisting of aluminum chloride, ferric chloride and zinc chloride, and at a temperature of from about 20° to about 80° C.

References Cited in the file of this patent

Ross et al.: "The Chemical Trade Journal and Chemical Engineer," March 24, 1939, page 287.